United States Patent [19]

Endo et al.

[11] Patent Number: 5,575,675

[45] Date of Patent: Nov. 19, 1996

[54] FEEDER CONNECTOR

[75] Inventors: Takayoshi Endo; Shigemi Hashizawa; Toshiaki Hasegawa, all of Haibara-gun, Japan

[73] Assignee: Yazaki Corporation, Tokyo, Japan

[21] Appl. No.: 413,957

[22] Filed: Mar. 30, 1995

[30] Foreign Application Priority Data

Apr. 1, 1994 [JP] Japan ................................ 6-064931

[51] Int. Cl.⁶ .................................................... H01R 13/62
[52] U.S. Cl. ............................................. 439/310; 439/34
[58] Field of Search ................................ 439/34, 35, 310, 439/350, 351

[56] References Cited

U.S. PATENT DOCUMENTS

| | | | |
|---|---|---|---|
| 3,345,604 | 10/1967 | Henschen et al. | 439/310 |
| 4,083,619 | 4/1978 | McCormick et al. | 439/310 |
| 4,624,472 | 11/1986 | Stuart et al. | 439/34 |
| 4,859,196 | 8/1989 | Durando et al. | 439/310 |
| 5,080,594 | 1/1992 | Swinford | 439/35 |
| 5,344,331 | 9/1994 | Hoffman et al. | 439/310 |
| 5,350,312 | 9/1994 | Kuno et al. | 439/310 |
| 5,417,579 | 5/1995 | Yoshioka et al. | 439/310 |
| 5,433,623 | 7/1995 | Wakata et al. | 439/310 |
| 5,458,496 | 10/1995 | Itou et al. | 439/34 |
| 5,462,439 | 10/1995 | Keith | 439/34 |

Primary Examiner—Gary E. Elkins
Attorney, Agent, or Firm—Armstrong, Westerman, Hattori, McLeland & Naughton

[57] ABSTRACT

A feeding-side connector and a receiving-side connector are provisionally fitted to each other so that these connectors are locked by engagement of a locking hole of the feeding-side connector and a locking arm of the receiving-side connector. In this state, the lever of a toggle mechanism is pushed down forward until it hits on the front surface of a lever chamber. Thus, a fixed assembly composed of a connector body and a wire protection jig for a group of wires connected to the female terminals thereof advances to complete the electric connection between the female terminals and male terminals. The driving side link and follower side link of the lever are placed in the state concaved in a rotating direction of the lever from its substantially horizontal direction, thus locking these links.

9 Claims, 11 Drawing Sheets

FEEDER CONNECTOR

BACKGROUND OF THE INVENTION

1. Field of the Invention

The present invention relates to a feeder connector used for charging for electric vehicles, and more particularly to a feeder connector which can easily cause a male terminal to be fit into a female terminal with minimum force.

2. Description of the Prior Art

Figure 11:
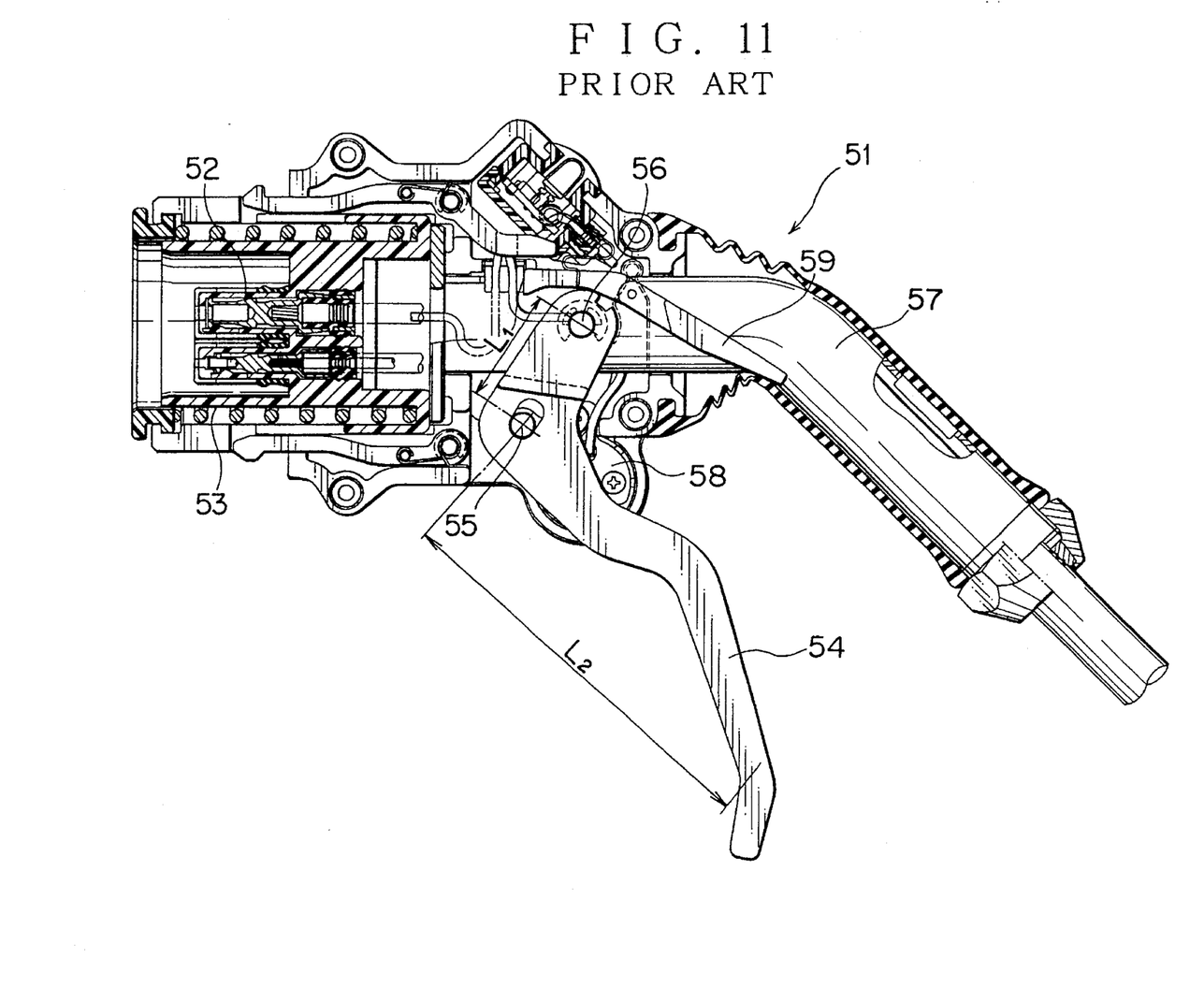
FIG. 11 is a view for explaining the conventional feeding side connector.

FIG. 11 shows a feeding-side connector 51 which has been proposed in U.S. Pat. No. 5,350,312 issued Sep. 27, 1994 one inventor of which is included in the inventors of the present application. The feeding-side connector 51 adopts the principle of a lever as a means for pushing a connector body 53 incorporating a female terminal 52 forward. When a lever 54 is grasped, the feeding-side connector 51 rotates at a fulcrum of pin 55. Then, a pin 56 serves as an operating point so that the connector body 53 is pushed by means of a handle 57. The relaxing rate of insertion force using the lever 54 can be represented by an equation (L1/L2)×100% as apparent from FIG. 11.

In using the above feeding-side connector, the lever 54 or handle 57 is operated by one hand or both hands. Therefore, the lever stroke which is much larger than the palm of a hand cannot be obtained and the stroke of the connector body 53 cannot be also increased. Thus, the force of insertion is also limited. For this reason, such a feeding-side connector as shown in FIG. 11 is not suitable as a large scale connector for a large current.

Further, an electric lock 58 and a releasing lever 59 associated with the lever 54 are used in order to maintain the fit-lock state between the feeding-side connector 51 and a corresponding receiving-connector (not shown). This makes the internal structure of the feeding-side connector complicated, thus requiring a long time for its assembling.

SUMMARY OF THE INVENTION

The present invention has been completed in order to solve the above problems.

An object of the present invention is to provide a feeder connector which is simple in structure and easy in its assembling and can provide large insertion force so that it can be suitably used as a large-scale connector for a large current.

In order to attain the above object, in accordance with the present invention, there is provided a feeder connector comprising: a feeding-side connector; a receiving-side connector to be fitted to said feeding-side connector; and a toggle mechanism for fitting said feeding-side connector to the receiving-side connector, said toggle mechanism being a lever, wherein said feeding-side connector and said receiving-side connector are fit to each other by rotation of said lever.

In the present invention, fitting of the feeding-side connector and the receiving-side connector is done by rotation of the lever constituting as a toggle link mechanism. Therefore, small force leads to large insertion force, thus simplifying the required work. The feeder connector thus obtained can be suitably used as a large-scale connector for a large current. Adoption of the toggle link mechanism permits the lever to be locked without using other components, thereby simplifying the structure and makes its assembling easy.

The above and other objects and features of the present invention will be more apparent from the following description taken in conjunction with the accompanying drawings.

DESCRIPTION OF THE PREFERRED EMBODIMENTS

Figure 1:
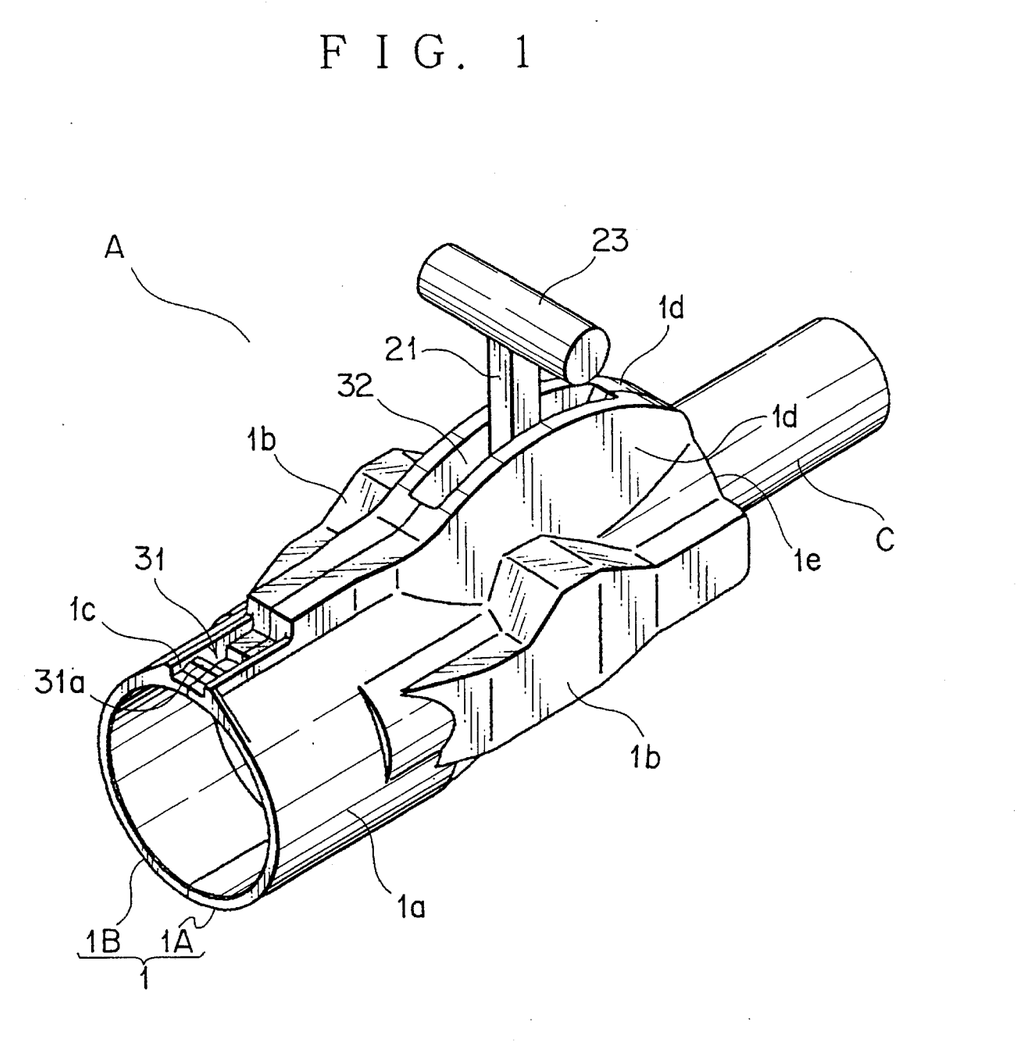
FIG. 1 is a perspective view of the feeding-side connector according to one embodiment of the present invention.
Figure 2:
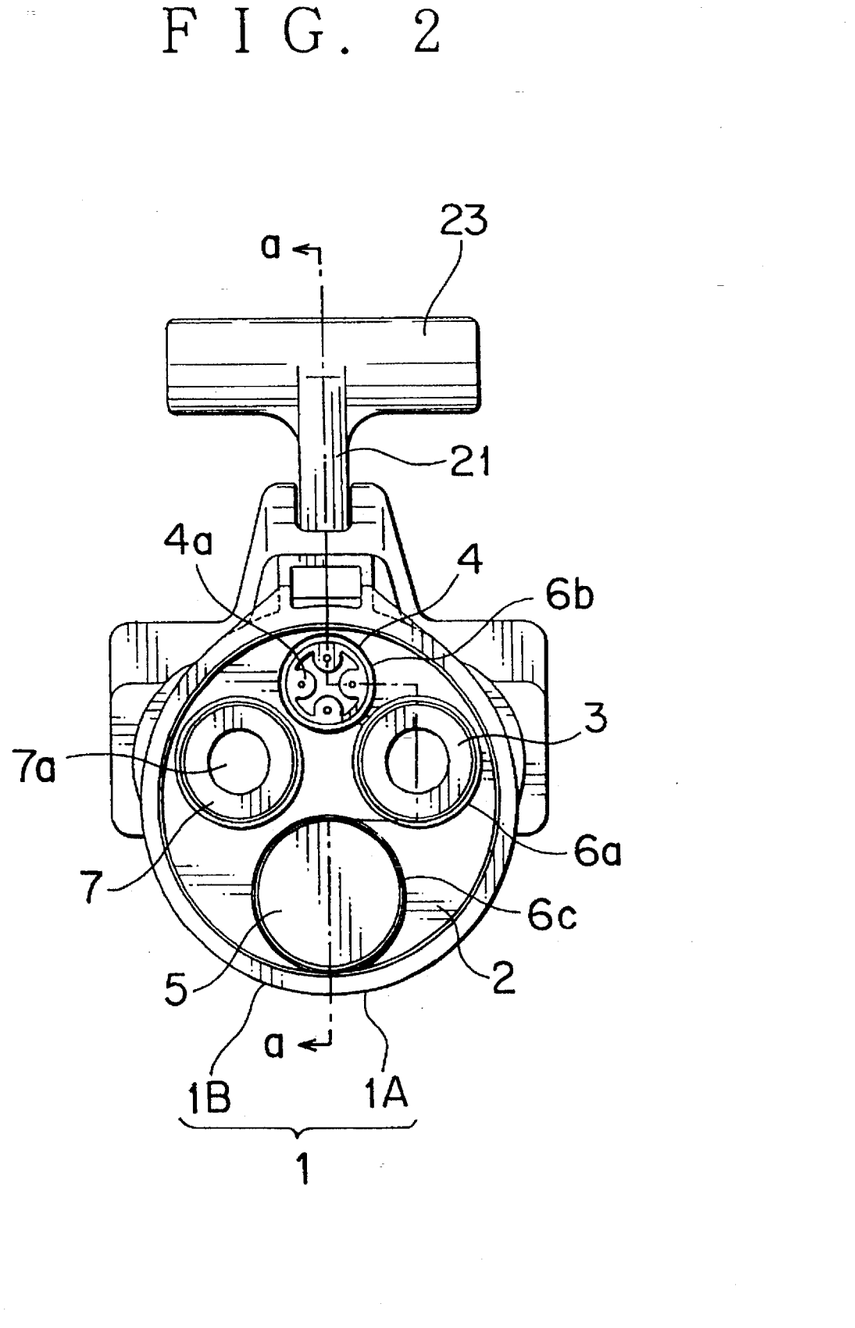
FIG. 2 is a front view of FIG. 1.
Figure 3:
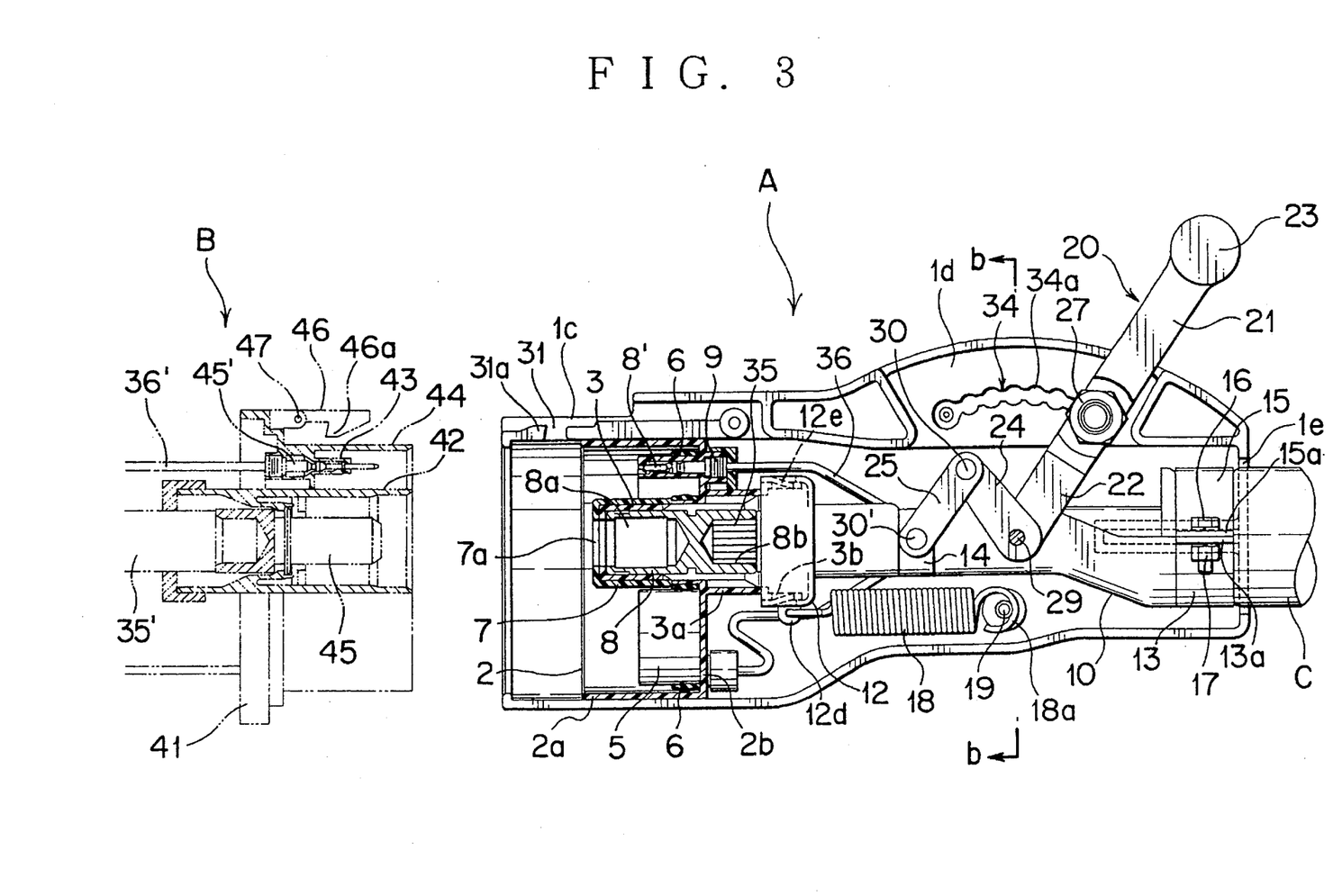
FIG. 3 is a vertical cross-sectional view of the feeding side connector taken along line a—a of FIG. 2.

As seen from FIGS. 1 to 3, the feeder connector includes a feeding-side connector A and a receiving-side connector B. The connector A is attached to a feeder or power supply device (not shown) and the connector B is attached to a vehicle body. Symbol C denotes a cable.

In the feeding-side connector A, reference numeral 1 denotes a casing of synthetic resin composed of a pair of split-type cases 1A and 1B.

In the front half section of the casing 1, a connector body 2 of synthetic resin incorporating a plurality of female terminals 8, 8', whereas in the rear half section of the casing 1, a wire protection jig 10 incorporating a group of connecting wires 35, 36 extending from the connector body 2 is slidably mounted. The wire protection jig 10 is forced backward by a spring 18. The connector body 2 and the wire protection jig 10 are adapted to advance by the operation of a lever 21 serving as a toggle mechanism 20.

In the casing 1, the split-type case 1A (1B) has a semi-circular body 1a. The semi-circular cylindrical body 1a has a bearing chamber 1b which is formed to swell on its intermediate peripheral wall in the area from the central portion to the rear portion. At the front edge of the upper portion where the split-type cases 1A and 1B are mated with each other, a concave portion 1c is formed. In the area from the concave portion 1c to the rear edge, lever protection walls 1d, 1d are formed to rise in an arc shape. At the end of the semi-circular cylindrical body 1a, an opening 1e is provided to pull out a cable C.

Figure 6:
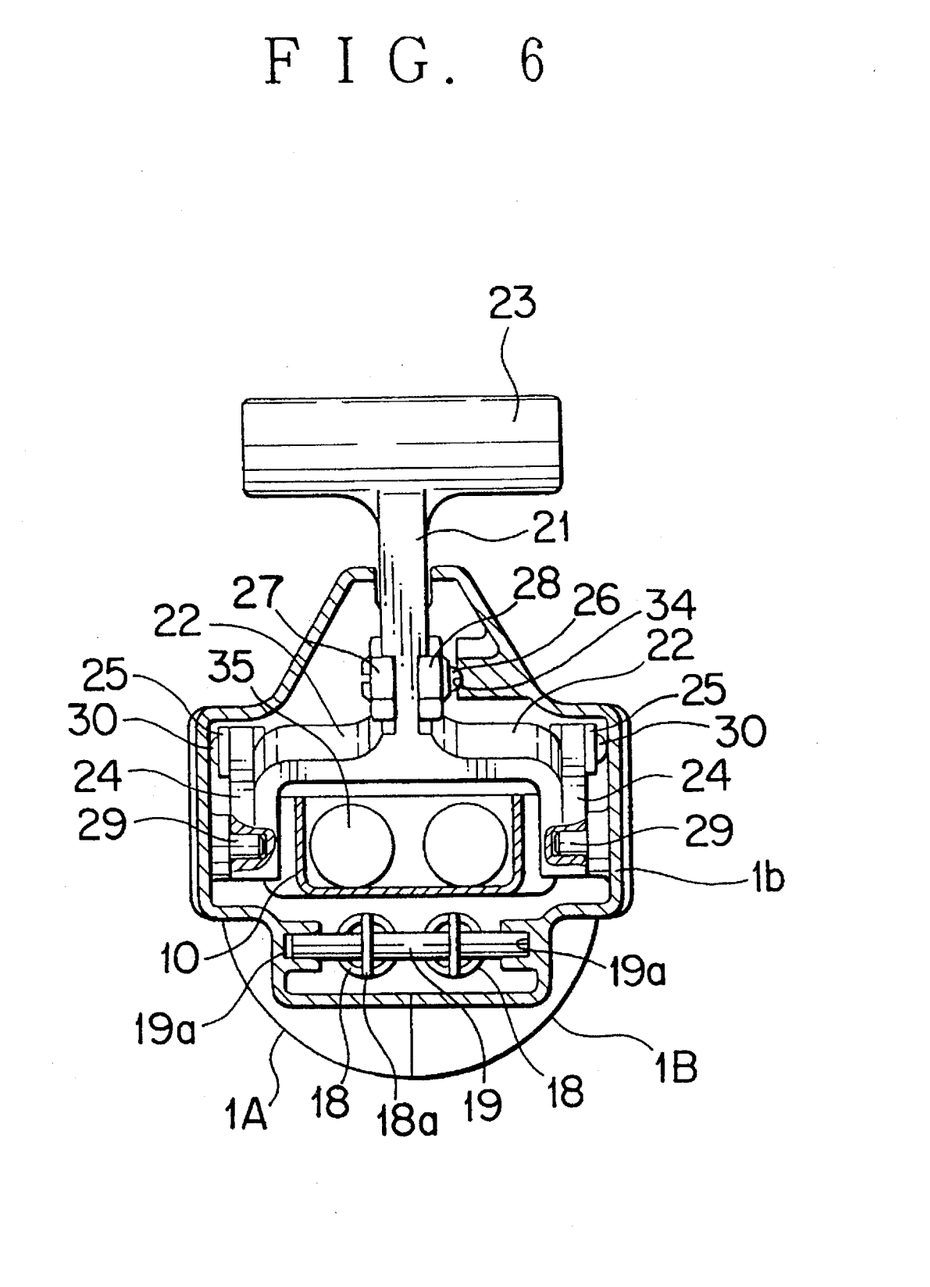
FIG. 6 is a sectional view taken along line b—b of FIG. 3.

As seen from FIG. 6, on the inner wall of the semi-circular cylindrical body 1a in the lower portion of the bearing chamber 1b, receipt openings 19a, 19a for a spring locking pin 19 are formed. On the inner wall of the bearing chamber 1b, bearing pins 29, 29 for the lever 21 are protruded. The above concave portion 1c includes a guide groove for a locking arm 46, which will be described later, of the receiving-side connector B in the state where the split-type cases 1A and 1B are mated with each other, and includes a locking opening for the locking arm 46. Likewise, the lever protection walls 1d, 1d facing each other forms a lever receiving chamber 32. On the inner wall 1d of the split-type case 1B, a guide groove 34 having an arc shape is formed.

The connector body 2 includes a cylindrical hood 2a at its front end, which includes two relatively large terminal chambers 3, 3 at both sides at the center, a composite terminal chamber 4 composed of a plurality of relatively small terminal chambers 4a, 4a at the upper portion, and a preliminary terminal chamber 5 at the lower portion. Each of the chambers 3, 4 and 5, which are cylindrical, are formed integrally to a common substrate 2b. In the hood 2a, water-proof packings 6a, 6b, and 6c are mounted on the outer peripheral walls of the chambers, respectively.

Each of the large terminal chambers 3, 3 is covered with an insulating cap 7 having a male terminal passing-through opening 7a at its front end and incorporates a female terminal 8 for power line connection. The female terminal 8 includes a male terminal receiving hole 8a at its front end and a wire connection hole 8b at its rear end. The connection hole 8b is connected to a power line 35 which is a part of the cable C. The female terminal 8, a large-size terminal which can withstand a large current of 400 A (ampere), can be fabricated from a copper rod by cutting. The wire connection hole 8b and the power line 35 can be connected with each other by a known technique such as crimping, soldering and laser welding.

In each terminal chamber 4a of the composite terminal chamber 4, a normally small-sized female terminal 8' is stored and locked. A signal line 36 from the cable C is crimped and connected to the terminal of the female terminal 8'. The terminal of the female terminal 8' is covered with a waterproof rubber stopper 9. The portion connecting the female connector 8 to the power line 35 is also covered with a water-proof stopper (not shown for simplicity of illustration). The preliminary terminal chamber 5 is provided to receive the connector mounting portion (not shown) for a small current with which the receiving-side connector B may be provided. It should be noted that the preliminary terminal chamber is not necessarily required.

Figure 4:
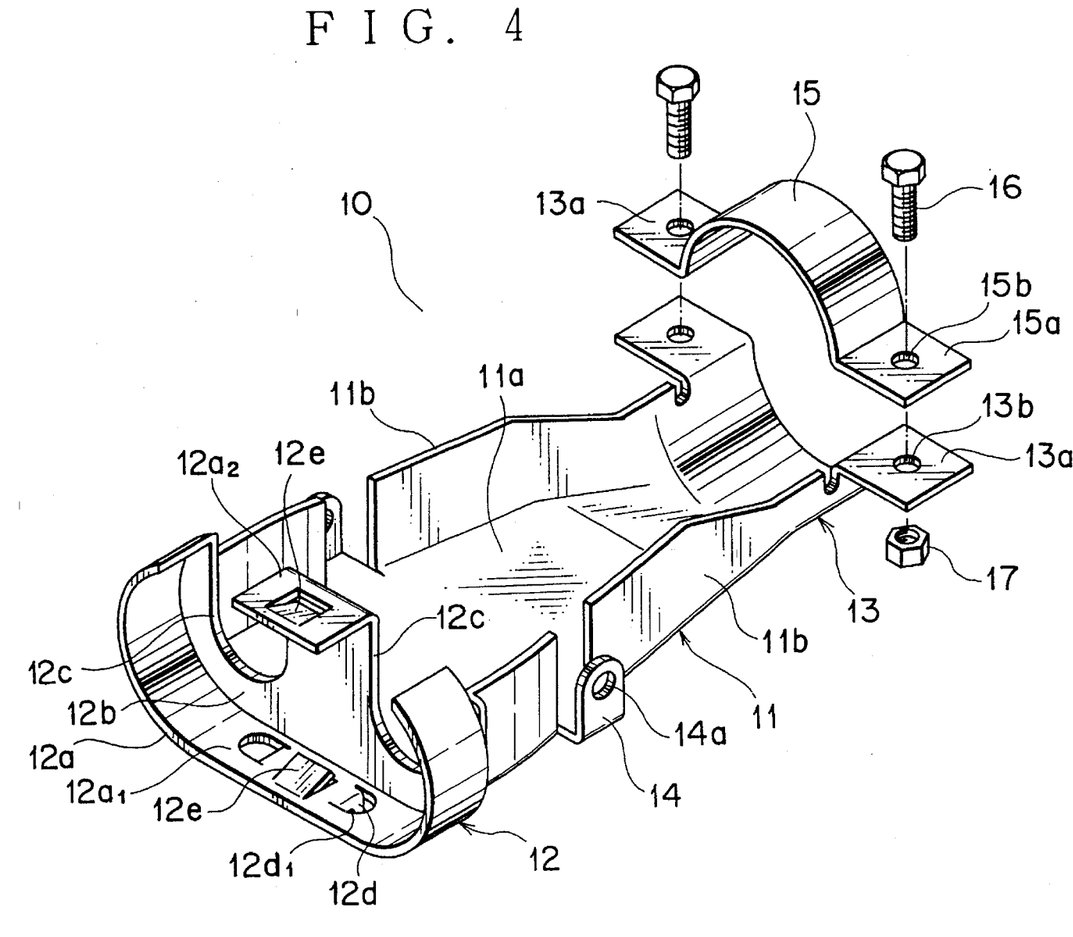
FIG. 4 is an exploded perspective view of the wire protection jig 10 in FIG. 3.

As shown in FIG. 4, the wire protection jig 10 is formed as a barrel body 11 as a whole. The barrel body 11 has a connector fixing portion 12 at its front end and a cable fixing portion 13 at its rear end. The barrel body 11 includes a bottom wall 11a whose width gradually increases from the rear portion to the front portion and upright side walls 11b, 11b on its both sides. In the neighborhood of the connector fixing portion 12 of the upright side wall 11b, a linkage bearing 14 having axial holes 14a, 14a is provided in an upright manner so as to protrude outwardly. The wire protection jig 10 is preferably made of light metal such as aluminum or aluminum alloy, stainless steel from the viewpoint of corrosivity and strength, or hard synthetic resin having a large mechanical strength. Such hard synthetic resin includes linear-structure plastic (engineering plastic) such as polyacetal, polyphenylene sulfide, glass fiber reinforced plastic and carbon reinforced plastic.

The connector fixing portion 12 is formed as a cap which is covered on the rear protruding portion 3a of the terminal chamber 3 in the connector body 2, and is composed of a peripheral wall 12a and rear wall 12b. The rear wall 12b has, on its both right and left sides, recesses 12c, 12c for passing through the power line 35 successively to the peripheral wall 12a. On the other hand, on both sides in the lower edge 12a of the peripheral wall 12a, spring locking pieces 12d, 12d having holes 12d1, 12d1 are formed downwards. Between both locking pieces 12d and at the upper edge 12a2, lances 12e are formed.

The cable fixing portion 13 is a semi-circular barrel body for receiving the cable C. The cable fixing portion 13 has tightening pieces 13a, 13a formed in a wing manner in which bolt passing through-holes 13b, 13b are made from the upper edges on both side walls. The cable fixing portion 13 has also a sem-icircular cable tap in which tightening pieces 15a, 15a provided with bolt passing-through holes 15b, 15b are formed on its both sides, respectively.

The connector body 2, wire protection jig 10 and cable C can be fixed in the following manner.

First, the power line 35 from the connector body 2 is received in the barrel body 11 through the recesses 12c and 12c, and the connector fixing portion 12 is covered on the rear protruding portion 3a of the connector body 12. Then, the lances 12e and 12e at the lower edge portions 12a1 and 12a2 are engaged with the locking grooves previously made in the rear protruding portion 3a. Thus, the connector body 2 and the wire protection jig 10 are fixed. Next, the cable tap 15 is covered on the cable fixing portion 13 at the rear position, and the tightening pieces 13a and 15a are tightened by a bolt 16 and nut 17. Thus, the wire protection jig 10 and the cable C are fixed.

Figure 5:
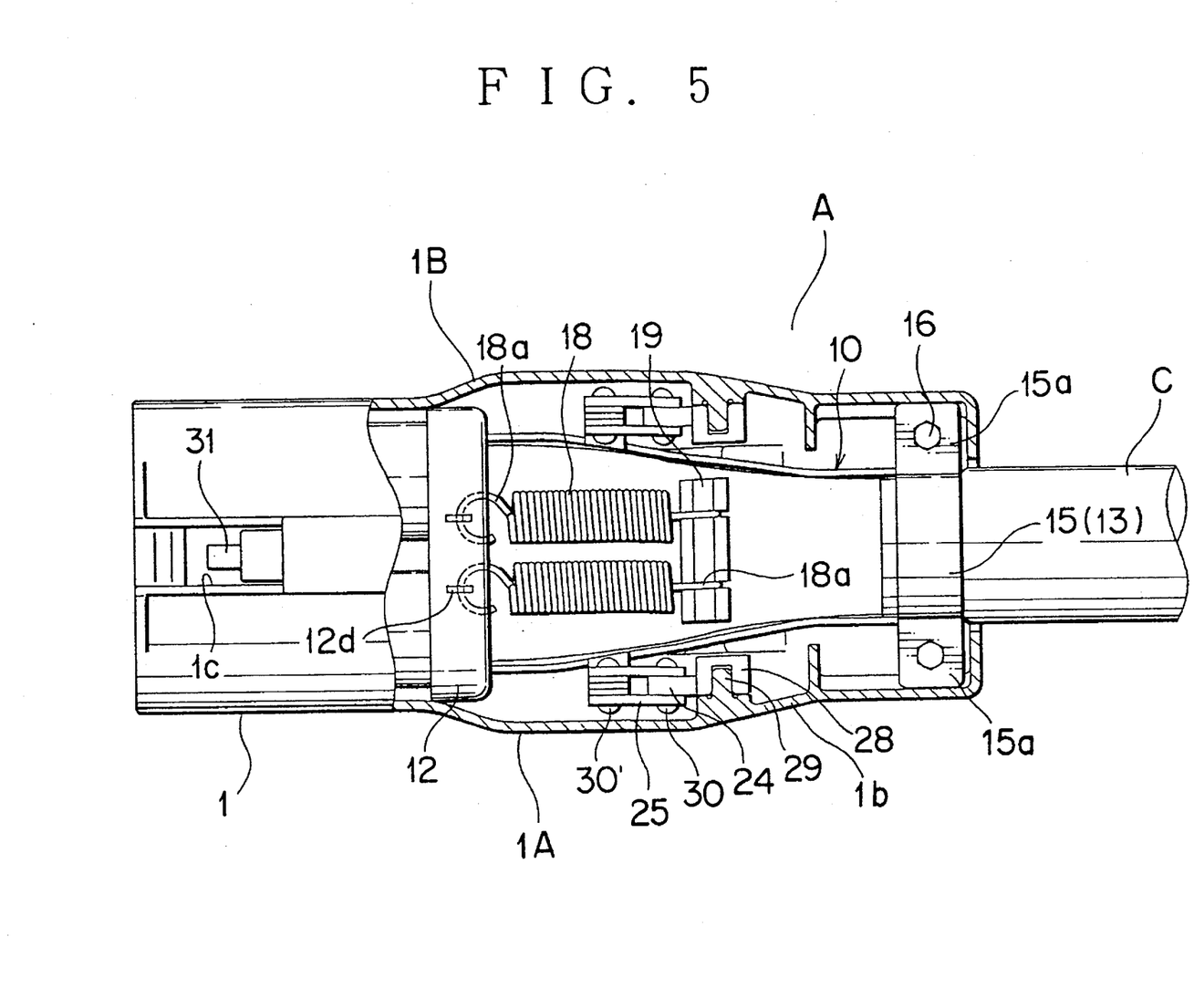
FIG. 5 is a horizontal sectional view of the main part of the feeding-side connector in FIG. 1.

As described above, the connector body 2, wire protection jig 10 and cable C are integrally fixed as an assembly. The assembly thus formed is received in the casing 1. As described previously, the connector body 2 is slidable in the front half section of the casing 1 and the cable C is externally pulled out from the opening 1e at the rear end of the casing 1. On the other hand, as shown in FIG. 5, in the rear end of the wire protection jig 10, the cable fixing portion 13 and the wing-like tightening pieces 15a, 15a (13a, 13a) of the cable tap 15 are kept in slidable contact with the inner wall of the right and left split-type cases 1A and 1B. Thus, the above fixed assembly is mounted in the casing so that its front and rear end portions are slidable.

In this state, the hook portion 18a at one end of the spring 18 is hung on a spring locking pin 19 and another hook portion 18a at the other end thereof is hung on the spring locking piece 12d of the wire protection jig 10 so that the above entire fixed assembly is always forced backward. A toggle link mechanism 20 for advancing the assembly is also provided.

The toggle link mechanism 20 includes a lever 21 composed of a grip 23 at the upper end portion, two-branch legs 22, 22 on both sides of the lower end and a driving side link 24 which protrudes upwards from the lower end of the legs 22, 22 which are integrally formed, and a follower side link 25 rotatably coupled with the free end of a driving side link 24 through a pin 30. The lever 21 integrally provided with the driving side link 24 is rotatably supported by a bearing pin 29 of the bearing chamber 1b. The follower link 25 is supported by the link bearing 14 of the wire protection jig 10 through a pin 30'.

It is assumed that the length of the driving side link 24 and that of the follower side link 25, i.e. the distance of pin 29 -pin 30 and that of pin 30 -pin 30' are made substantially equal to each other. A ball plunger 26 is fixed to the lever 21 by nuts 27 and 28, and the ball plunger 26 is engaged with an arc-shaped guide groove 34 of the above split-type case 1B. Concave portions 34a are formed at regular intervals, thus making detachment feeling (FIG. 6).

The leg 22 of the lever 21 and the driving side link 24 may be formed as individual components and fixed by a known means such as rivet and a screw.

On the other hand, in the receiving-side connector B, the connector body 41 is provided with terminal chambers 42 and 43 corresponding to the terminal chambers 3 and 4 of the feeding-side connector A and a shell encircling these chambers. The terminal chamber 42 accommodates a male terminal 45 connected to a power line 35' and the terminal chamber 43 accommodates a male terminal 45' connected to a signal line 36'. The connector body 41 is provided with a locking arm 46 on its shell 44. The locking arm 46 which extends forward in a direction in parallel to the connector fitting direction and is rotatably adapted by a pin 47. On the lower side of the tip of the locking arm 46, a locking piece 46a is formed.

An explanation will be given of the fitting and detaching between the feeding-side connector A and the receiving-side connector B using a toggle link mechanism 20.

Figure 7:
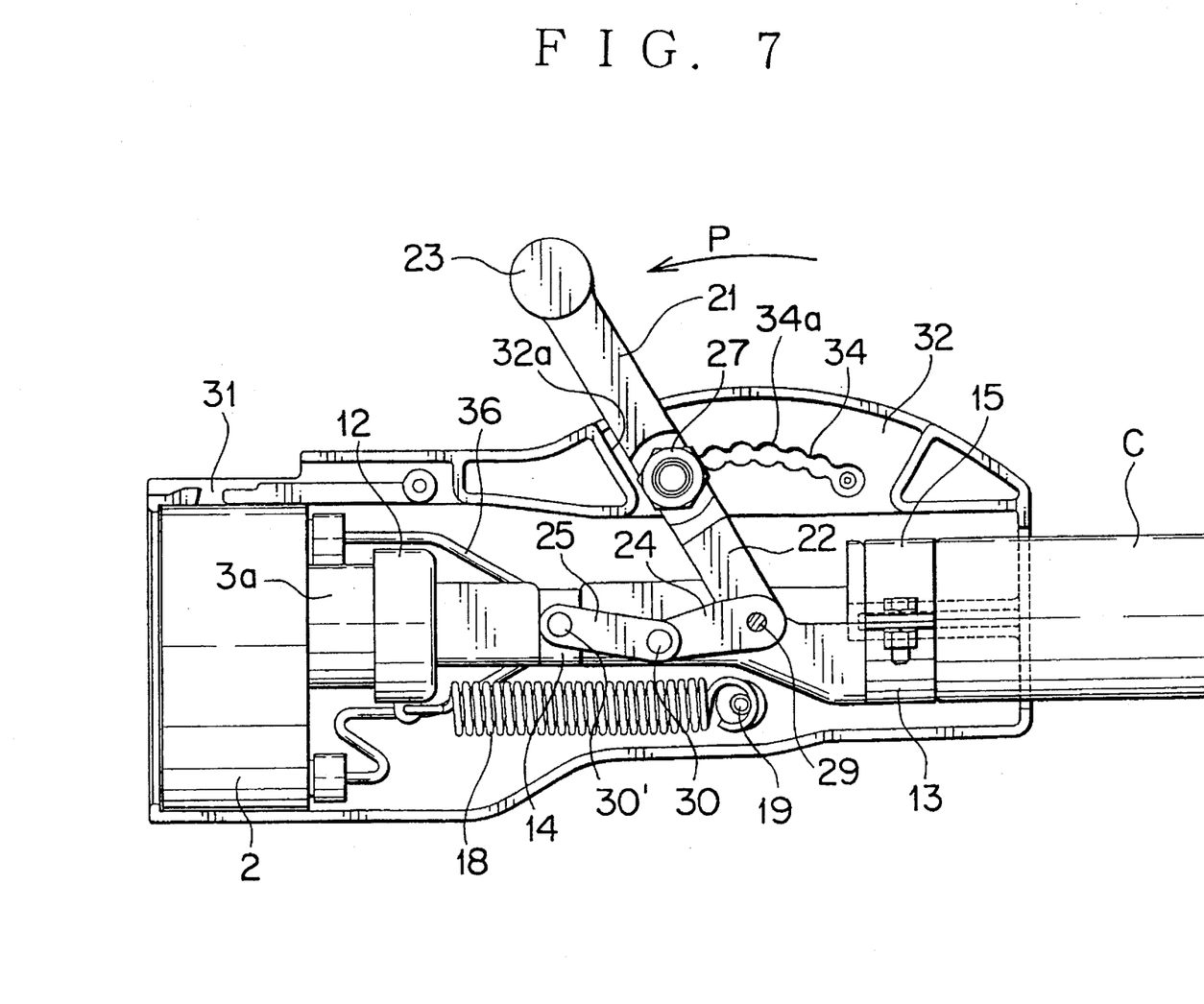
FIG. 7 is a sectional view of the state where the lever in FIG. 3 has been pushed down.

FIG. 7 shows the state where the lever 21 has been pushed down as indicated by an arrow P using the grip 23. The lever 21 is rotated at a fulcrum of the pin 29 on the side of lever 21 while the driving side link 24 is also rotated at a fulcrum of the pin 29.

As a result, the follower side link restricted by a pin 30 is rotated at a fulcrum of the pin 30' on the side of the wire protection jig 10 in a direction reverse to the driving side link 24 so that the wire protection jig 10 and connector body 2 advance against the pulling force of the spring 18. When the driving side link 24 and follower link 25 are aligned on a straight line or horizontally in FIG. 7, the degree of the extension of the spring 18 becomes maximum. Then, the pulling force of the spring 18 competes with the follower side link 25 and driving side link 24 so that both are placed in a balancing state. As a result, movement and rotation of the wire protection jig 10 and lever 21 are stopped.

When the lever 21 is operated, the ball plunger 26 (FIG. 6) located between it and the leg 22 is guided by the arc-shaped guide groove 34 of the split-type case 1B so that the lever 21 smoothly rotates with no swing.

When the lever 21 is released immediately before the degree of extension of the spring 18 becomes maximum, the wire protection jig 10 and connector 2 retreats because of the pulling force and returns to an initial position.

When the lever 21 is rotated slightly in a direction of the arrow P at the position of the maximum extension of the spring 18, the driving side link 24 and the follower side link 25 rotate downwardly at the fulcrums of the pin 29 on the side of the casing 1 and of the pin 30' on the side of the wire protection jig 10, respectively, which results in the state as shown in FIG. 7 in which the center of both links 24 and 25 are slightly concave. In this state, when the lever 21 is released, the lever 21 suffers from the force being rotated in the direction of the arrow P because of the spring 18. However, the lever 21 hits on the front face of the lever chamber 32 so that the lever 21 is not rotated but locked. Therefore, the lever 21 can be locked without using any other member and using the front surface 32a restricting the forward rotation in the lever chamber 32.

Conversely, the lever 21 can be unlocked in such a manner that it is rotated in a direction reverse to the direction of P so that it slightly shifts from the state where the driving side link 24 and the follower side link 25 are aligned on a straight line to provide the maximum extension of the spring 18. Fitting of the feeding-side connector A and the receiving-side connector B can be done as follows.

Figure 8:
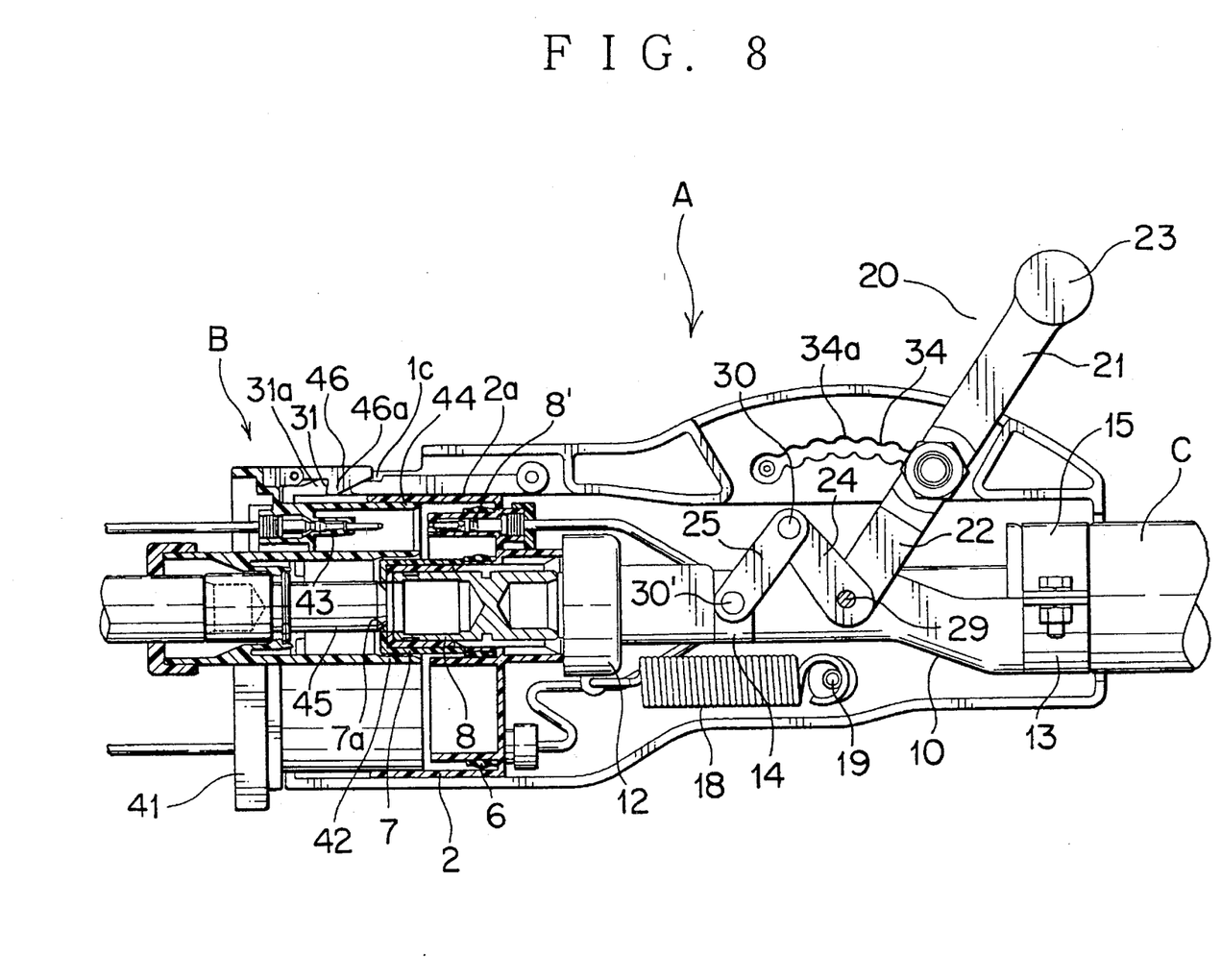
FIG. 8 is a vertical sectional view of the state where a feeding-side connector and a receiving-side connector have been fit to each other tentatively.

In a state where the concave portion 1c of the feeding-side connector A and the locking arm 46 of the receiving-side connector B are aligned, both connectors are fit to each other. Then, as shown in FIG. 8, while the locking arm 46 is guided by the concave portion 1c, the shell 44 of the connector B advances into the connector body 2. The locking piece 46a at the tip of the locking arm 46 climbs over the small protrusion 31a at the front edge of a locking hole 31 to be engaged with the locking hole 31. Thus, both connectors A and B are locked. Simultaneously with this locking, the tip of the terminal chamber 42 of the connector B is covered with the insulating cap 7 of the terminal chamber 3 of the connector A. As a result, the tips of the female terminal 8 and the male terminal 45 are placed in just before contact, and the terminal chamber 43 of the connector B and the terminal chamber 4 face with each other. Thus, both connectors A and B are fit to each other provisionally.

In the provisional fitting state of the feeding-side connector A and the receiving-side connector B, as shown with reference to FIG. 7, the lever 21 is rotated in the direction of arrow P until it fits on the front surface 32a of the lever chamber 32 so that it is locked. Thus, as described above, the connector body 2 advances together with the wipe protection jig 10 so that the female terminal 8 and the male terminal 45 are connected to each other and the female terminal 8' of the terminal chamber 4 and the male terminal 45' of the terminal chamber 44 are connected to each other. As a result, both connectors A and B are completely fit and locked. In the complete fitting state, the shell 44 of the receiving-side connector B is inserted into the hood 2a of the connector body 2. The terminal chambers 3, 4 and 5 are sealed by waterproof packings 6a, 6b and 6c, respectively.

In this way, fitting of the feeding-side connector A and receiving-side connector B can be done very easily using small force by rotation of the lever 21 serving as a toggle mechanism 20. The presence or absence of the provisional fitting of both connectors A and B can be recognized externally from the engagement of the locking arm 46 and the locking hole 31.

Figure 9:
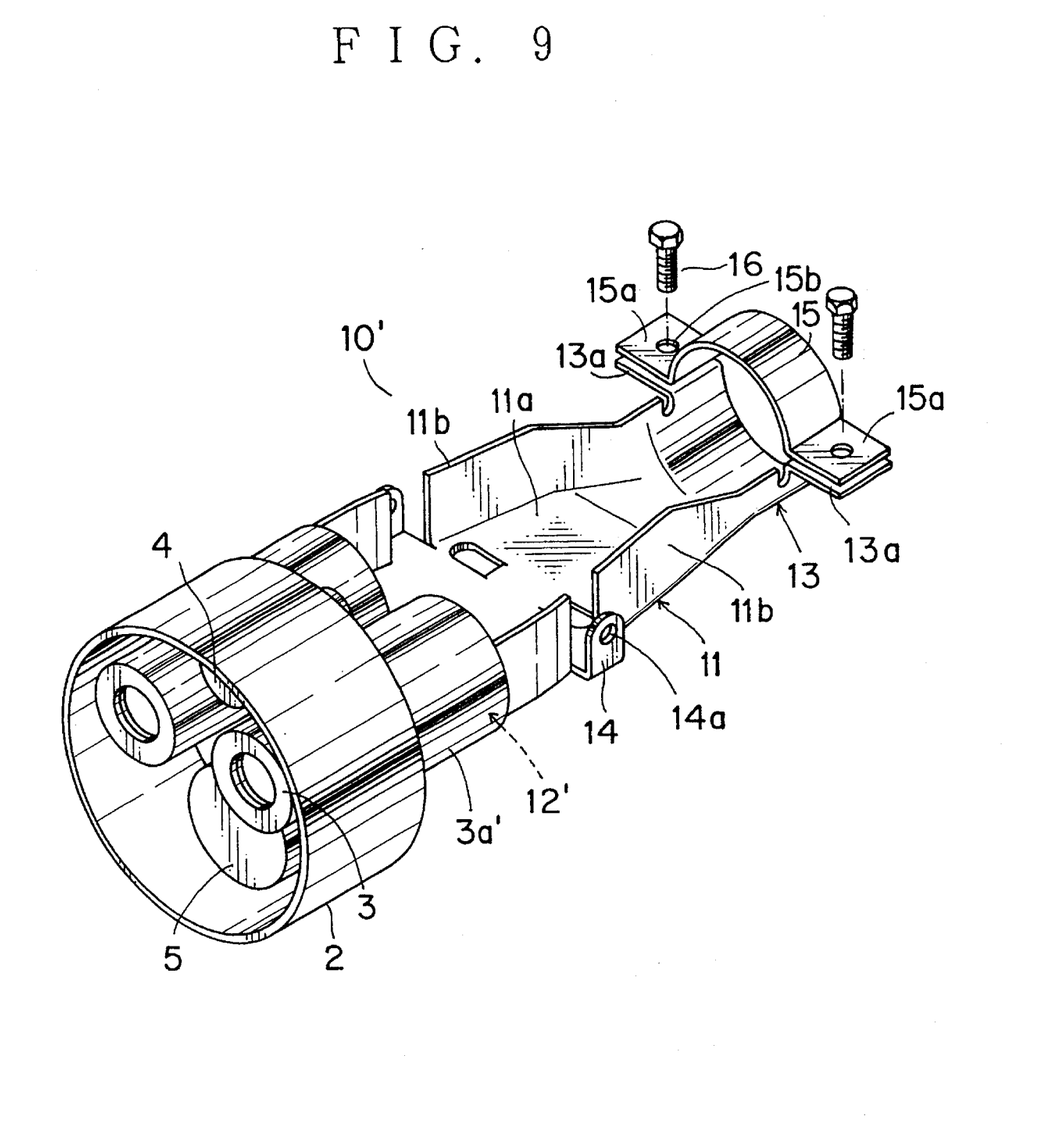
FIG. 9 is a perspective view of a fixed assembly of a wire projection jig and a connector body according to another embodiment of the present invention.
Figure 10:
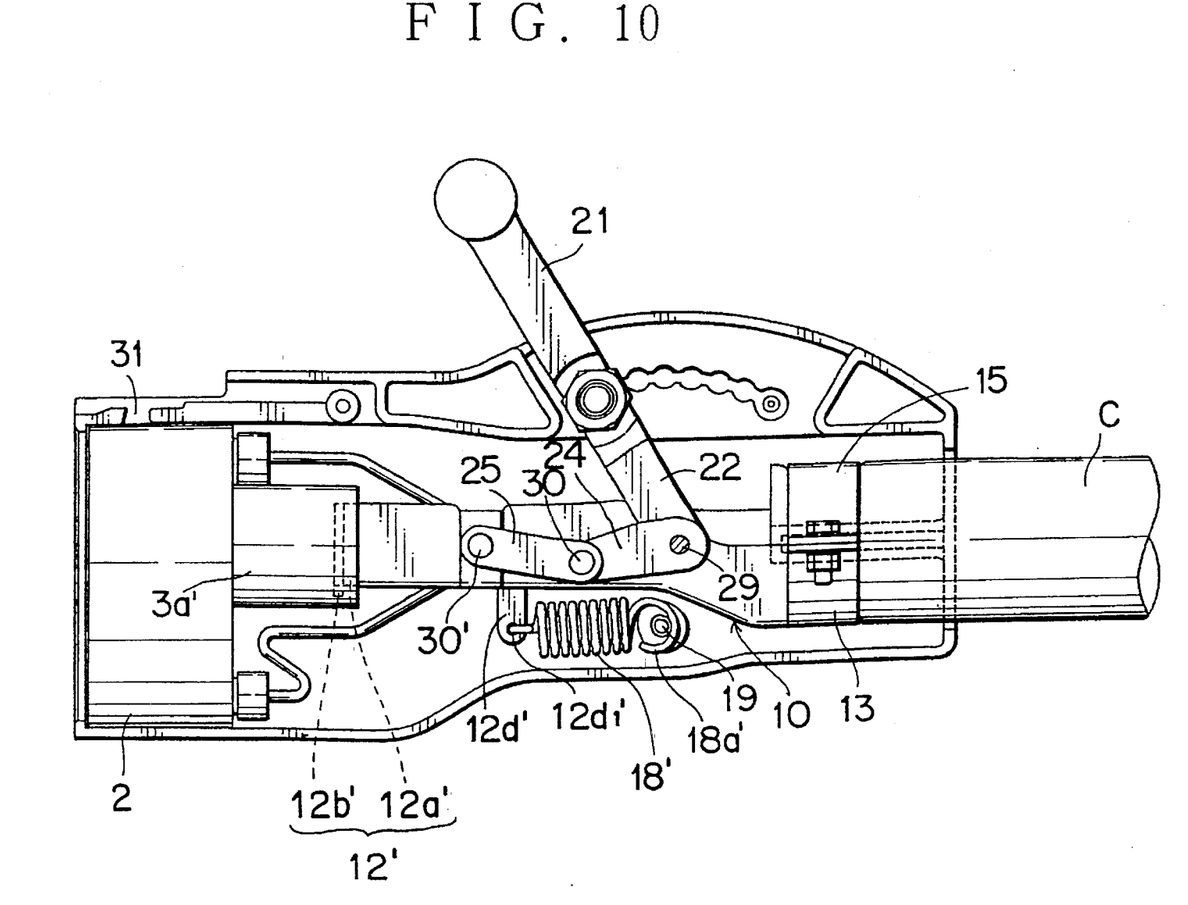
FIG. 10 is a longitudinal sectional view of feeding-side connector using the fixed assembly of FIG. 9.

FIGS. 9 and 10 show another embodiment of the present invention. With a wire protection jig 10' of stainless steel inserted into the connector body 2, they are fixed integrally. The wire protection jig 10' is formed as a barrel body 11 as a whole. The barrel body 11 has a connector fixing portion 12' at its front end and a cable fixing portion 13 at its rear end. In the neighborhood of the connector fixing portion 12' of the upright side wall 11b of the barrel body 11, a linkage bearing 14 having an axial hole 14a is provided. In the cable fixing portion 13 having tightening pieces 13a, 13a at the rear end, the cable C is fixed by a semi-circular cable tap 15.

The above structure of the wire protection jig 10' is the same as that of the wire protection jig 10. However, the forward connector fixing portion 12' of the wire protection jig 10' is composed of an extended portion 12a', which is formed by extending the tips of the bottom wall 11a and upright side wall 11b of the barrel body 11, and a flange 12b' attached to its outer periphery. The extended portion 12a' and flange 12b' and the flange 12b' are fixed to the rear protruding portion 3a' of the terminal chamber 3 in the connector body 2 by insertion molding.

Both sides of the front portion of the bottom wall 11a of the barrel body 11 are bent downwardly to form spring locking pieces 12d', 12d'. To each of their holes 12d1', a hook portion 18a' at one end of the spring 18' is hung.

In accordance with the embodiment shown in FIGS. 9 and 10, the connector body 2 and the wire protection jig 10' are fixed previously by insertion molding. For this reason, the number of components required for connector assembling and the number of man-hours of assembling are reduced. Unlike the connection by the engagement of the lance 12e and the locking groove 3b of the rear protruding portion 3a as in the wire protection jig 10, the wire protection jig 10' gives a stabilized structure because of strong coupling.

The wire protection jig 10' and the connector body 2 may be formed integrally using the same synthetic resin material. Otherwise, they may be formed as individual components using the same or different materials and integrated by the above insertion molding.

In the description made hitherto, the female terminals 8, 8' were used on the side of the feeding-side connector A and the male connectors 45, 45' were used on the side of the receiving-side connector B. The female terminals 8, 8' and the male terminals 45, 45' may be replaced by each other.

We claim:

1. A feeder connector comprising a feeding-side connector provided on a side of a power feeding and a receiving-side connector provided in a vehicle body, said feeding-side connector including a casing, a connector body slidably mounted on a front half section of said casing to accommodate a plurality of terminals, a barrel-shaped wire protection jig for accommodating lead wires connected to said terminals, one end of said wire protection jig being fixed to said connector body and the other end of said wire protection jig being slidably mounted to a rear half section of said casing, a spring for forcing said connector toward a rear of said casing, and a toggle link mechanism for advancing said connector body against said spring in said casing.

2. A feeder connector according to claim 1, wherein said toggle link mechanism includes a lever having a stem which is rotatably attached to said casing, a driving side link having two ends, one end of the driving side link attached to the stem of the said lever, and a follower side link having an end coupled with the other end of said driving side link and another end of the follower side link rotatably attached to said wire protection jig, whereby when said driving side link and said follower side link are aligned on a substantially straight line by rotation of said lever in a predetermined direction, a degree of extension of said spring becomes maximum.

3. A feeder connector according to claim 1, wherein said wire protection jig is composed of a barrel body, a connector fixing portion communicated with one end of said barrel body and a cable fixing portion communicated with the other end of said barrel body, said barrel body being provided with a link bearing for a follower side link at an intermediate portion of said barrel body, and said connector body and said lead wires connected to said plurality of terminals are unified as a fixed assembly.

4. A feeder connector according to claim 1, wherein said wire protection jig and said connector body are unified.

5. A feeder connector according to claim 1, wherein said casing is composed of a pair of split-type cases each having an intermediate peripheral wall, each of said pair of split-type cases has a bearing chamber on the intermediate peripheral wall, a bearing pin for a lever is provided on an inner wall of each of said bearing chambers and a pair of lever protection walls are provided at an upper edge portion mating said pair of split-type cases to form a lever chamber.

6. A feeder connector according to claim 5, wherein a front inner wall of said lever chamber is formed as a stopper holding said lever at a locking position.

7. A feeder connector according to claim 5, wherein an arc guide groove centered on said bearing pin is formed on the inner wall of one of said pair of lever protection walls, and an engagement member to be engaged with said guide groove is formed on one side of said lever.

8. A feeder connector according to claim 2, wherein a grip is provided on an upper end of said lever, a branching leg is fixed to a lower end of said lever, and the stem of said driving side link is integrally fixed to a lower end of said leg.

9. A feeder connector according to claim 2, wherein said driving side link and said follower side link have equal lengths.

* * * * *